United States Patent [19]
Dayan et al.

[11] Patent Number: 6,009,486
[45] Date of Patent: Dec. 28, 1999

[54] CARDBUS DOCKING STATION

[75] Inventors: Richard Alan Dayan, Wake Forest; David Carroll Challener, Raleigh; John M. Elmore, Wake Forest; Richard Allen Kelley, Apex, all of N.C.

[73] Assignee: International Business Machines Corporation, Armonk, N.Y.

[21] Appl. No.: 09/069,407

[22] Filed: Apr. 29, 1998

[51] Int. Cl.⁶ .................................................. G06F 13/00
[52] U.S. Cl. .................... 710/101; 710/100; 710/102; 710/103; 710/129; 710/62
[58] Field of Search ..................... 710/101, 100, 710/102, 103, 62, 126, 128, 129, 130

[56] References Cited

U.S. PATENT DOCUMENTS

| | | | |
|---|---|---|---|
| 5,664,197 | 9/1997 | Kardach et al. | 710/240 |
| 5,748,912 | 5/1998 | Lee | 710/102 |
| 5,764,968 | 6/1998 | Ninomiya | 713/601 |
| 5,838,059 | 11/1998 | Inoue et al. | 257/679 |
| 5,838,930 | 11/1998 | Harashima | 710/107 |
| 5,859,988 | 1/1999 | Ajanovic et al. | 710/129 |

OTHER PUBLICATIONS

"PicoPower Debuts Vesuvius System Controller and Nile Bridge Chip", Edge: Work–Group Computing Report, vol. 6, Issue 275, Aug. 8, 1995.

"SmartDock Without A Hitch . . . ", Electronic Buyers' News, Issue 965, p. 14, Jul. 25, 1995.

*Primary Examiner*—Ayaz R. Sheikh
*Assistant Examiner*—Ario Etienne
*Attorney, Agent, or Firm*—George E. Grosser

[57] ABSTRACT

A computer system with a PC Card external connector sends signals to PCI devices as if respective PC Card functions. A cooperating docking station connects to the PC Card connector and so processes the PC Card signals that a set of signals for supporting PCI bus standard are made available at a PCI bus of the docking station. The docking station is hence able to connect to a bus commonly available on computers, particularly laptop computers, for direct plug-in connection and yet supports connection of PCI adapters that otherwise tend to be supported only within a main computer at an internal PCI bus.

8 Claims, 14 Drawing Sheets

FIG. 4

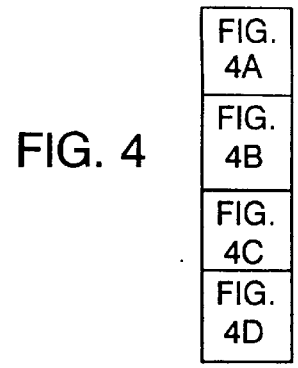

FIG. 4A

| Cardbus | | PCI | | Bridge Logic Source for Signal |
|---|---|---|---|---|
| Pin No. | Signal | Pin No. | Signal | |
| 1 | GND | 1A | 12V | local |
| 2 | CAD0 | 1B | TRST# | Signal Present Not Used |
| 3 | CAD1 | 2A | TCK | Signal Present Not Used |
| 4 | CAD3 | 2B | 12V | local |
| 5 | CAD5 | 3A | GND | local |
| 6 | CAD7 | 3B | TMS | Signal Present Not Used |
| 7 | CCBE0# | 4A | TDO | Signal Present Not Used |
| 8 | CAD9 | 4B | TDI | Signal Present Not Used |
| 9 | CAD11 | 5A | 5V | local |
| 10 | CAD12 | 5B | 5V | local |
| 11 | CAD14 | 6A | 5V | local |
| 12 | CCDB1# | 6B | INTA#16 | OR-ED TOGETHER |
| 13 | CPAR | 7A | INTB#16 | OR-ED TOGETHER |
| 14 | CPERR# | 7B | INTC#16 | OR-ED TOGETHER |
| 15 | CGNT# | 8A | INTD#16 | local |
| 16 | CINT# | 8B | 5V | local |
| 17 | Vcc | 9A | PRSNT1# | local |
| 18 | Vpp1 | 9B | reserved | local |
| 19 | CCLK | 10A | reserved | local |
| 20 | CIRDY# | 10B | 5V | local |
| 21 | CCBE2# | 11A | PRSNT2# | local |
| 22 | CAD18 | 11B | reserved | local |
| 23 | CAD20 | 12A | GND | local |
| 24 | CAD21 | 12B | GND | local |

FIG. 4B

| 25 | CAD22 | 13A | GND | local |
| 26 | CAD23 | 13B | GND | local |
| 27 | CAD24 | 14A | reserved | local |
| 28 | CAD25 | 14B | reserved | local |
| 29 | CAD26 | 15A | GND | local |
| 30 | CAD27 | 15B | RST# | 58 |
| 31 | CAD29 | 16A | CLK | 19 |
| 32 | RFU | 16B | 5V | local |
| 33 | CCLKRUN# | 17A | GND | local |
| 34 | GND | 17B | GNT# | 15 |
| 35 | GNC | 18A | REQ# | 60 |
| 36 | CCD1# | 18B | GND | local |
| 37 | CAD2 | 19A | 5V | local |
| 38 | CAD4 | 19B | reserved | local |
| 39 | CAD6 | 20A | AD31 | 66 |
| 40 | RFU | 20B | AD30 | 65 |
| 41 | CAD8 | 21A | AD29 | 31 |
| 42 | CAD10 | 21B | 3.3V | local |
| 43 | CVS1 | 22A | GND | local |
| 44 | CAD13 | 22B | AD28 | 64 |
| 45 | CAD15 | 23A | AD27 | 30 |
| 46 | CAD16 | 23B | AD26 | 29 |
| 47 | RFU | 24A | AD25 | 28 |
| 48 | CBLOCK# | 24B | GND | local |
| 49 | CSTOP# | 25A | 3.3V | local |
| 50 | CDEVSEL# | 25B | AD24 | 27 |
| 51 | Vcc | 26A | C/BE[3]# | 61 |
| 52 | Vpp2 | 26B | IDSEL | Generated by Fig. 5 Logic |
| 53 | CTRDY# | 27A | AD23 | 26 |
| 54 | CFRAME# | 27B | 3.3V | local |
| 55 | CAD17 | 28A | GND | local |
| 56 | CAD19 | 28B | AD22 | 25 |
| 57 | CVS2 | 29A | AD21 | 24 |
| 58 | CRST# | 29B | AD20 | 23 |

| | | | | | FIG. 4C |
|---|---|---|---|---|---|
| 59 | CSERR# | 30A | AD19 | 56 | |
| 60 | CREQ# | 30B | GND I | local | |
| 61 | CCBE3# | 31A | 3.3V | local | |
| 62 | CAUDIO | 31B | AD18 | 22 | |
| 63 | CSTSCHG | 32A | AD17 | 55 | |
| 64 | CAD28 | 32B | AD16 | 46 | |
| 65 | CAD30 | 33A | C/BE[2]# | 21 | |
| 66 | CAD31 | 33B | 3.3V | local | |
| 67 | CCD2# | 34A | GND | local | |
| 68 | GND | 34B | FRAME# | 54 | |
| | | 35A | IRDY# | 20 | |
| | | 35B | GND I | local | |
| | | 36A | 3.3V | local | |
| | | 36B | TRDY# | 53 | |
| | | 37A | DEVSEL# | 50 | |
| | | 37B | GND | local | |
| | | 38A | GND | local | |
| | | 38B | STOP# | 49 | |
| | | 39A | LOCK# | 48 | |
| | | 39B | 3.3V | local | |
| | | 40A | PERR# | 14 | |
| | | 40B | SDONE | local | |
| | | 41A | 3.3V | local | |
| | | 41B | SBO# | local | |
| | | 42A | SERR# | 59 | |
| | | 42B | GND | local | |
| | | 43A | 3.3V | local | |
| | | 43B | PAR | 13 | |
| | | 44A | C/BE[1]# | 12 | |
| | | 44B | AD15 | 45 | |
| | | 45A | AD14 | 11 | |
| | | 45B | 3.3V | local | |
| | | 46A | GND | local | |
| | | 46B | AD13 | 44 | |

| | | | | |
|---|---|---|---|---|
| | | 47A | AD12 | 10 |
| | | 47B | AD11 | 9 |
| | | 48A | AD10 | 42 |
| | | 48B | GND | local |
| | | 49A | GND | local |
| | | 49B | AD09 | 8 |
| | | 50A | KEY | local |
| | | 50B | KEY | local |
| | | 51A | KEY | local |
| | | 51B | KEY | local |
| | | 52A | AD08 | 41 |
| | | 52B | C/BE[0]# | 7 |
| | | 53A | AD07 | 6 |
| | | 53B | 3.3V | local |
| | | 54A | 3.3V | local |
| | | 54B | AD06 | 39 |
| | | 55A | AD05 | 5 |
| | | 55B | AD04 | 38 |
| | | 56A | AD03 | 4 |
| | | 56B | GND | local |
| | | 57A | GND | local |
| | | 57B | AD02 | 37 |
| | | 58A | AD01 | 3 |
| | | 58B | AD00 | 2 |
| | | 59A | 5V | local |
| | | 59B | 5V | local |
| | | 60A | ACK64# | local |
| | | 60B | REQ64# | local |
| | | 61A | 5V | local |
| | | 61B | 5V | local |
| | | 62A | 5V | local |
| | | 62B | 5V | local |

FIG. 4D

CARDBUS DOCKING STATION

FIELD OF THE INVENTION

The present invention relates to docking stations for portable computers and, more particularly, to a docking station for a portable computer.

BACKGROUND OF THE INVENTION

It is known to use a docking station to provide added resources such as hard drives or CD drives for a portable computer. Docking stations, if they are to support a variety of resources such as CD drives and adapter cards, require a complex bus connection. Docking stations to date are customized so a particular docking station is limited to cooperate with a specific computer or family of computers. And, it is typical that docking stations have proprietary, single-purpose connections to the base machine.

SUMMARY OF THE INVENTION

The invention recognizes that the PC Card connector is available on many of today's computers, particularly laptops, but is somewhat deficient for providing broad expansion flexibility. By so controlling certain lines of the PC Card bus that they provide selected additional control information, from time to time, it is possible, according to the invention, to implement a docking station that supports a bus complying with the PCI standard while connecting to the laptop through the PC Card connector. This expanded support thus makes possible a docking station with slots for the PCI interface that offers the expansion opportunities using off-the-shelf PCI adapter cards normally used for desktop computers.

In a specific preferred embodiment plural PCI devices (e.g. hard drive and CD drive) at the docking station are controlled to appear to be a single controlled device to the PC Card interface. Indeed the invention allows such connection while nonetheless conforming to the PC Card standard.

It is thus preferred that the standard drivers for the devices on the PCI bus send signals to the PC Card interface as if respective PC Card functions. The docking station then extracts signals from selected PC Card channels and creates the necessary signals to support a full-function, multi-device-capable PCI bus at the docking station.

BRIEF DESCRIPTION OF THE DRAWINGS

Preferred implementations for the inventions will now be described with reference to the drawings wherein:

FIGS. 4A–4D is a table indicating the PC Card pinout and the PCI bus pinout along with a column indicating the PCI bus source for the signals on each pin;

DESCRIPTION OF THE PREFERRED EMBODIMENT

In order to support PCI Devices installed in a CardBus Docking Station according to the invention, the user system must see the connected PCI devices as a single PCI device with multiple functions while at the PCI bus the devices function as normal. As is described below, tailored bridge logic initializes the system and then selectively converts signals arriving and departing the docking station to make this transition.

Figure 1:
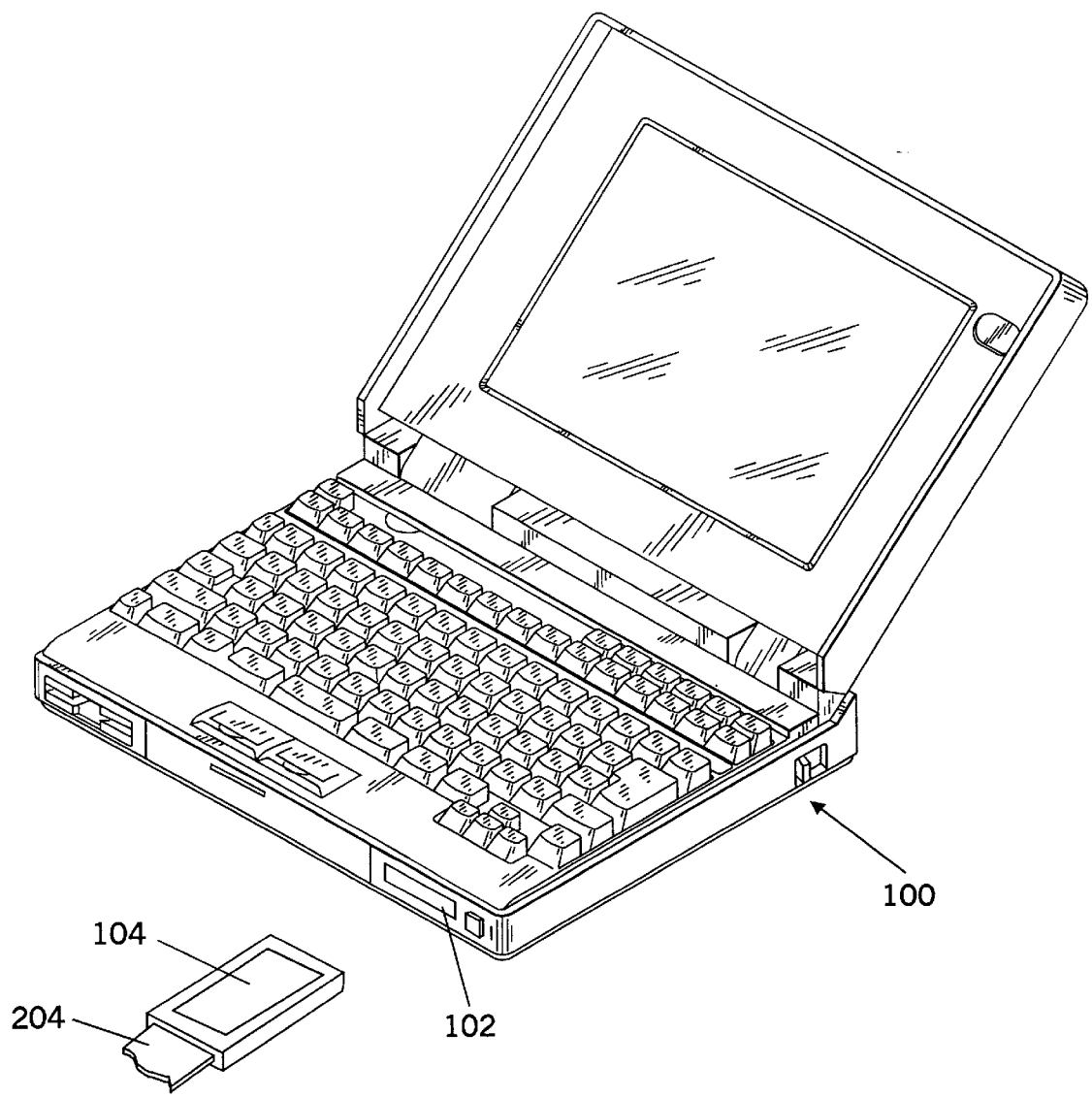
FIG. 1 is a front right perspective view of a portable system in which the invention may be employed.

Referring to FIG. 1, a computer system 100 is adapted to receive a PC Card accessory 104 at a receptacle 102 as is well known. Now considering FIG. 2, a docking station 200 for expansion of a system such as system 100 (FIG. 1) may provide, for example a compact disk storage device 202 or fixed drive 203 (connected at cable 203) and is according to the invention provided with a connection cable 204 with a connector card 104 complying with the well known PC Card specification.

Figure 3:
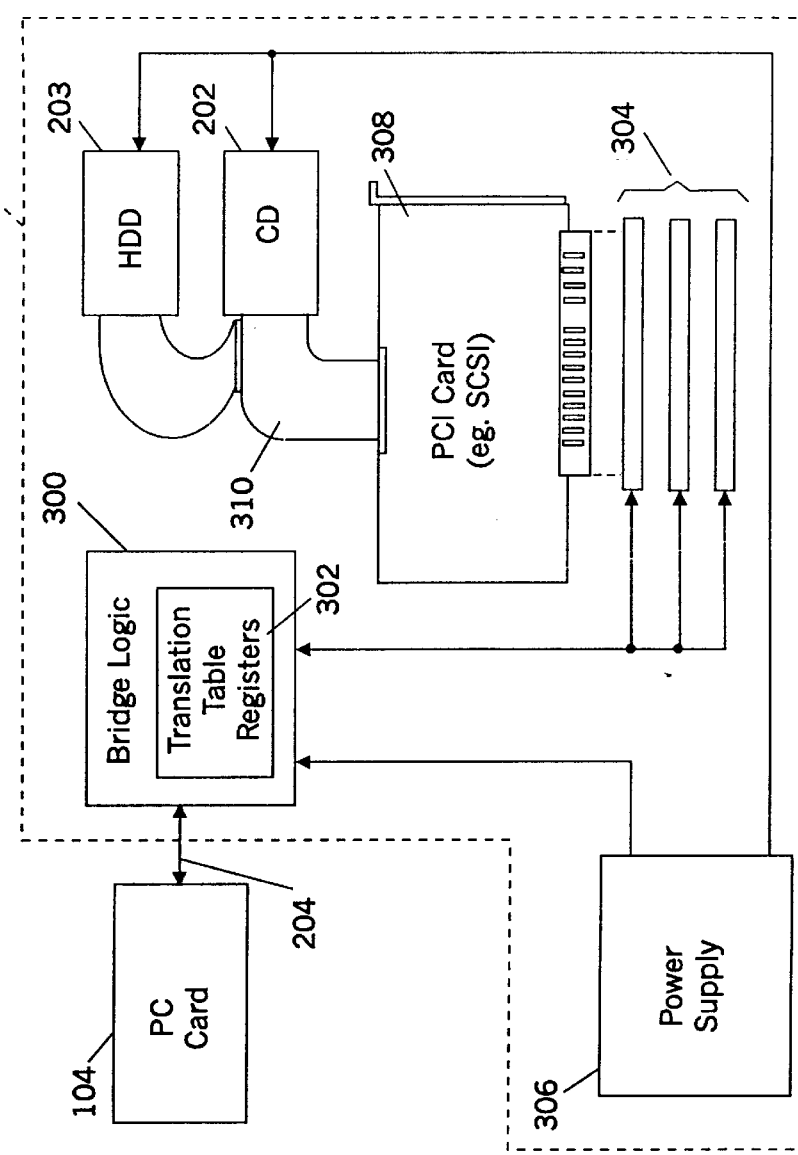
FIG. 3 is a block diagram for a docking station according to the invention with a bridge to convert customized PC Card signals to support a PCI bus.

Referring to FIG. 3, a docking station 200 consists of bridge logic 300, a PCI bus 304, a power supply 306, a signal cable 204 and a PC Card accessory 104. The interface definition used to connect the PC Card accessory to the host computer system 100 at the receptacle 102 is the CardBus interface which is well known and commonly available on laptop and notebook computers.

Referring again to FIG. 3, the cable 204 supplies signals, according to the invention, to bridge logic 300 which is included in the docking station 200 and converts the signals received by the PC Card accessory 104 to conform to the well known PCI specification. The bridge logic 300 may be implemented in a hardware ASIC or by programmed logic executed on a general purpose processor (not shown) as is well known. Such logic is described below in terms of logic defining flow charts suitable to enable those skilled in the art to implement either form of signal processing logic. The driver logic provided in the system 100 treats each PCI device as a respective logical function of the PC Card permitting up to eight devices to be supported according to the PC Card specification.

At FIGS. 4A–4D, the pin assignments for PC Card and PCI bus are specified. The sources for the various PCI signals are indicated in a separate column and selected signals derived by the bridge logic are identified ("local" or logically derived according to the flowchart of FIG. 5).

Signals according to the CardBus protocol are transmitted over the docking station cable 204 to the bridge logic 300. The bridge logic 300, according to a preferred implementation for the invention, performs two distinct functions to make possible the support of multiple PCI devices. The first is to configure devices connected at a PCI channel 304 which is coupled to PCI side of the bridge logic 300. For example, a SCSI adapter 308 with multiple devices must appear at the PC Card side as a single device. Such device may have up to eight functions and, according to the invention, respective functions are translated to correspond to respective devices. While somewhat limiting relative to normal PCI this permits up to eight devices to be supported at the docking station without using a custom interface. The second function is to monitor the signals transmitted over cable 204 and convert all configuration reads and writes to correspond to the appropriate device identifiers on the PC Card and PCI sides of the bridge logic, respectively.

Figure 2:
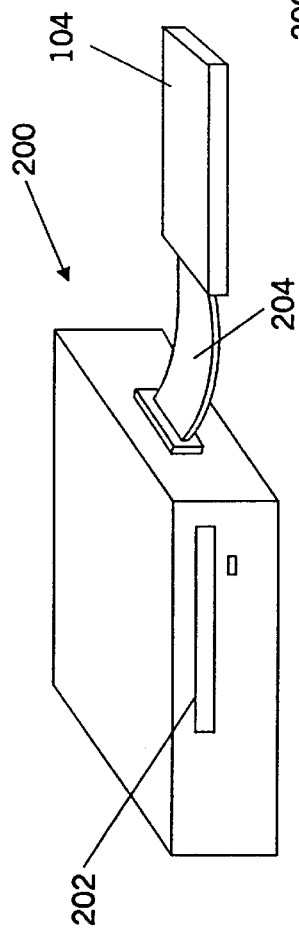
FIG. 2 is a front right perspective view of a docking station for implementing the invention.
Figure 5A:
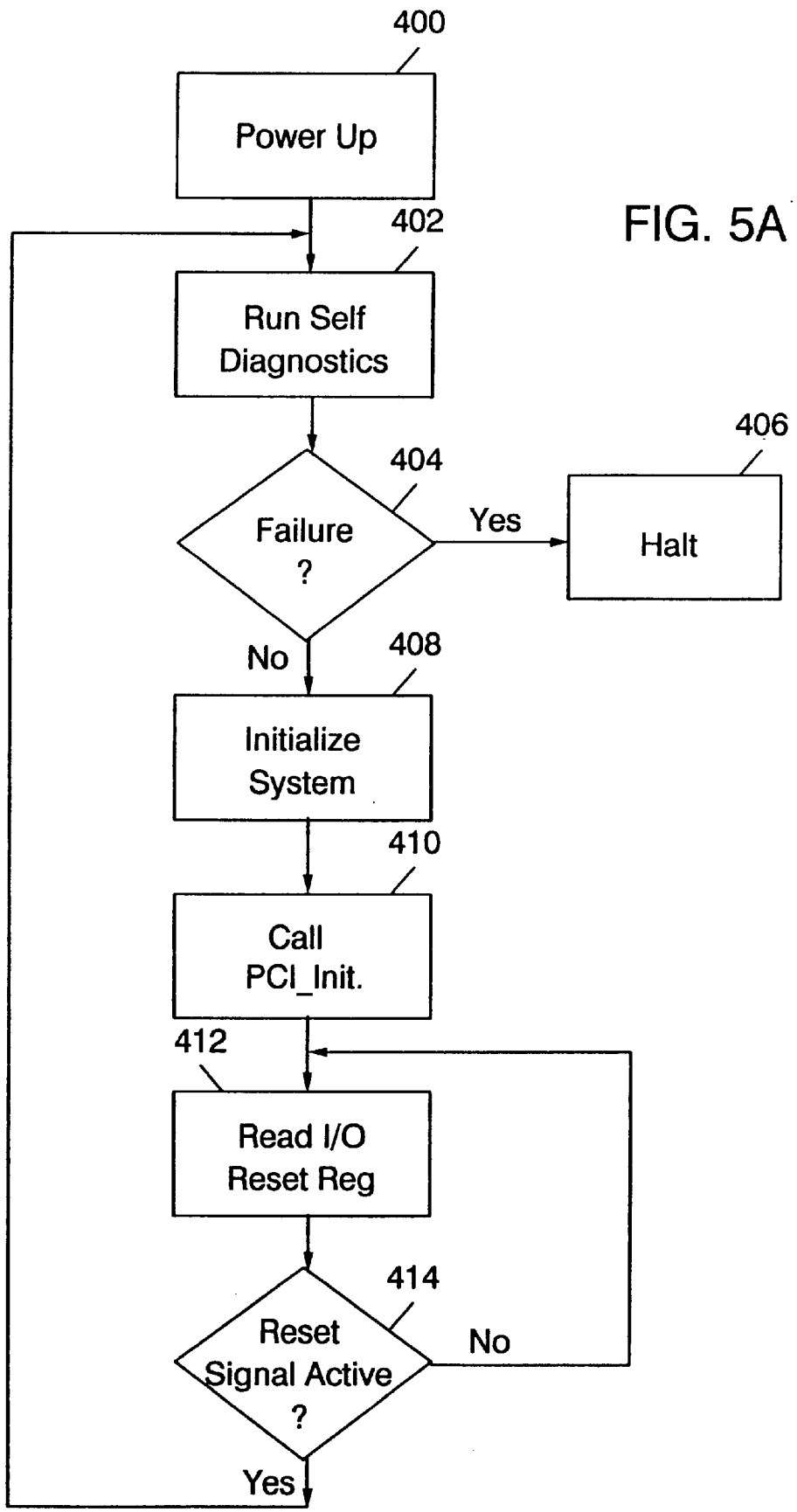
FIGS. 5A–5B, 6A–6B, 7A–7B and 8A–8B are flow charts indicating bridge logic, according to a preferred implementation for the invention, for receiving customized information over the PC Card connector and converting it to support multiple devices on a PCI bus.
Figure 5B:
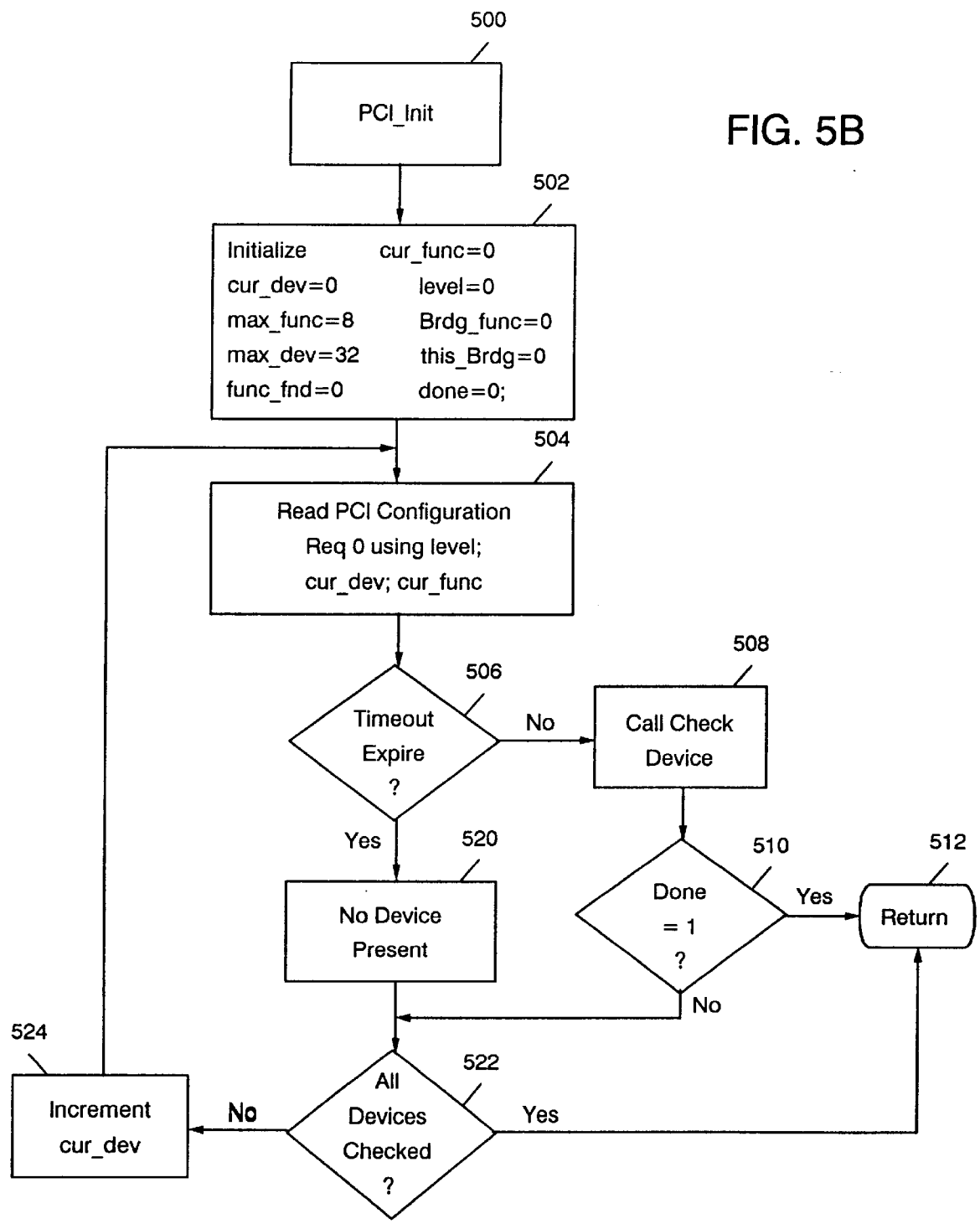

Referring to FIGS. 2 and 5A, the docking station 200, at powerup performs the configuration of the PCI channel 304 so that it appears at the receptacle 102 as a single multi-function CardBus PC Card. Starting at step 400 power up, the bridge logic 300 performs its self diagnostics(402). At step 404, a test is made to determine if the docking station self tests all completed successfully. If there was a failure (406) the station does not configure and the routine halts. If all tests complete successfully (408) the docking station is initialized (408) and then the channel initialization routine is invoked (410). Once initialized, the docking station checks the 110 reset register (412) to determine if the host system wants to perform a reset function in the docking station. The register 302 is tested (414) to determine if it is active. If active, the docking station reruns its configuration procedure starting at step 402. If not active, it returns to step 412 to continually monitor the reset signal.

The PCI_INIT routine 500 (see FIG. 5B) is invoked at step 410. At step 502, several parameters are initialized which are used to determine if any devices are present in the channel. The configuration space is read using the current values of the parameters 504. If the read times out 506, no device is present (520) and a check is made to see if all potential configuration spaces have been accessed (522). If not, the current device counter, CUR_DEV (524) is incremented and the procedure restarts at step 504. If all configuration spaces have been checked the routine returns to the caller (512).

Referring back to step 506, if the read configuration space completes successfully, the Check Device routine is invoked. Following the check device routine, the initialization code is checked to see if all devices have been found or the maximum number of functions allowed have been detected (510). If yes, initialization stops and the code returns to the calling routine. If not, the initialization routine continues its execution in step 522 as previously described.

Figure 6A:
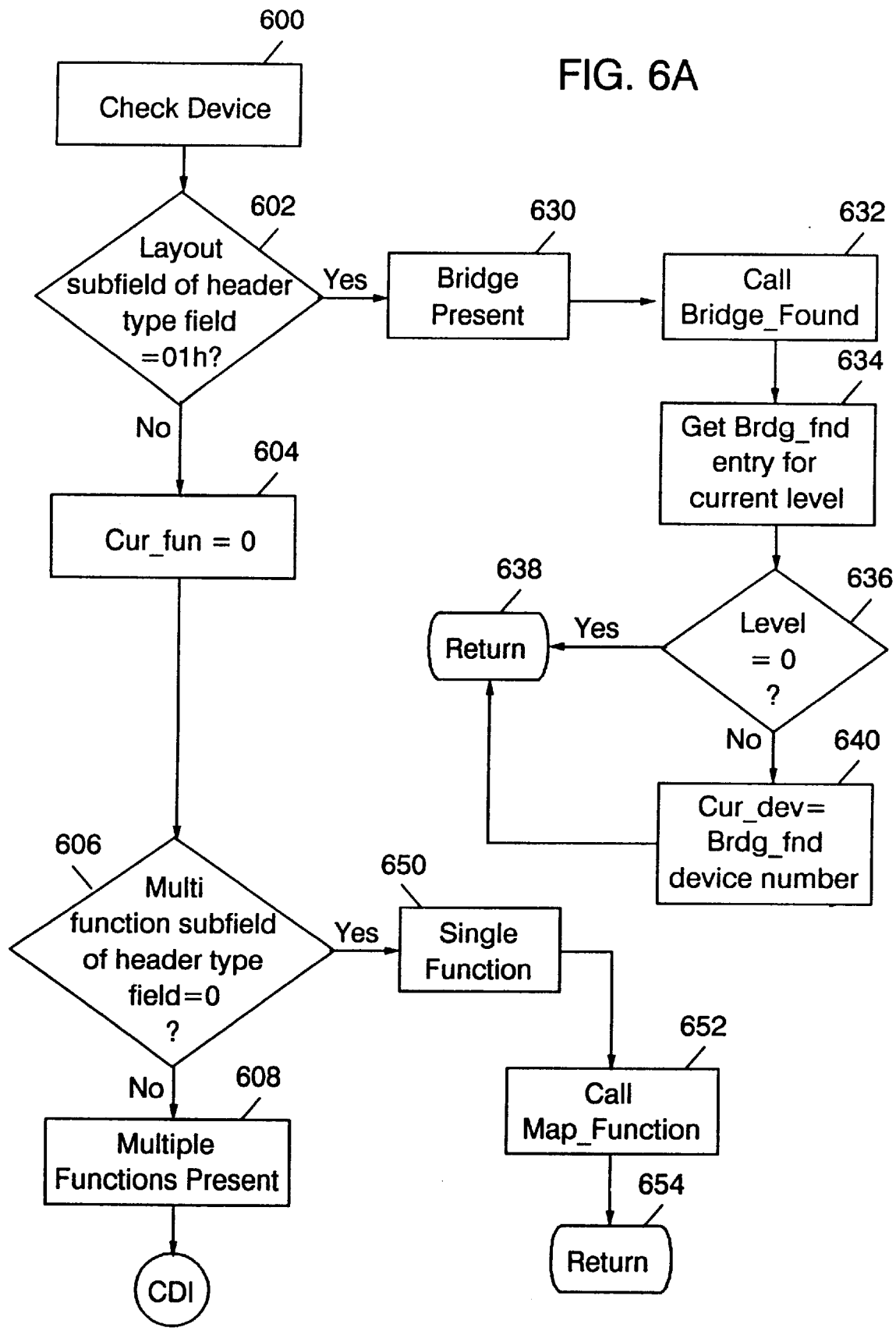

Referring to FIG. 6A, the Check Devices routine 600 is executed to inspect the PCI channel for resident devices. The Layout Subfield of the Header type field is checked to see if a device or bridge is present (602). If present (630), the code proceeds to further check as to what devices are present, including other bridges in the Bridge_Found routine 632. Next the level of bridge is reestablished by accessing the Brdg_fnd table using the current level as an index (634). The level field is checked to see if a secondary bridge exists at this level (636). If a secondary bridge does not exist, the code returns to the calling routine 638. If a secondary bridge does exist, its level is established as the next level to interrogate (640) and the code returns to the calling routine 640.

Returning to step 602, as a bridge is not present, a device is present. This device is checked for multiple functions. First the current function pointer is reset to 0 (604). At step 606, the multifunction subfield of the header type field is checked to determine if only a single function exists (606). If a single function exists (650) the Map_Function routine 652 is invoked to map the physical address to the corresponding CardBus logical address as viewed at the PC Card accessory 104. The code then continues by returning to the caller (654).

Figure 6B:
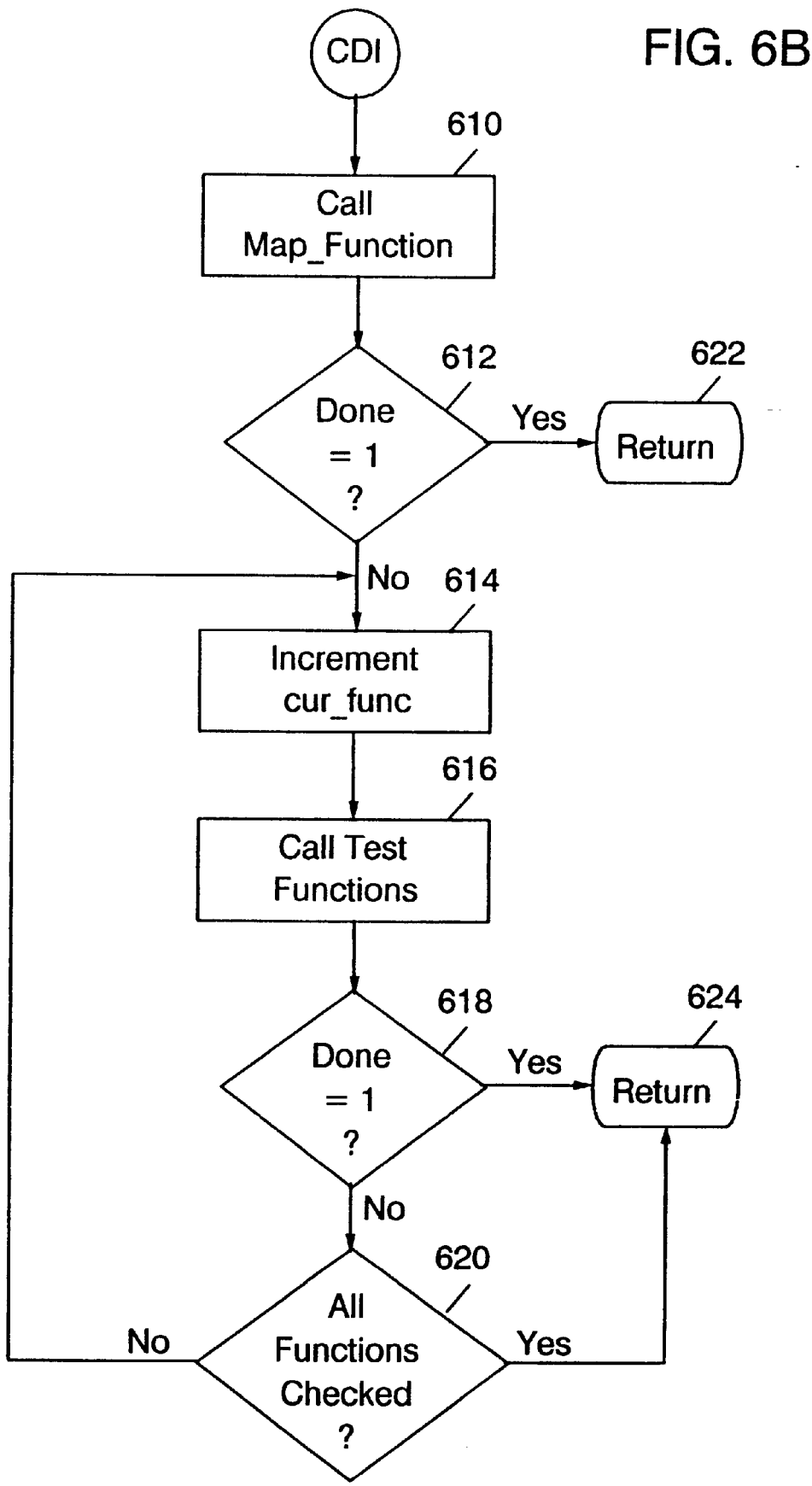

If multiple functions exist on the device 608, the code, see FIG. 6B, examines all potential function numbers to see where the other functions reside. The first function, always function number 0, is then mapped to its logical CardBus address (610), as viewed from the PC Card accessory 104. On returning, the code checks to see if the eight potential logical CardBus functions have been initialized (612). If done, initialization cannot proceed and the code returns to its caller (622). If in step 612, not all logical functions have been assigned, the current function assigned counter is incremented (614). The test function routine is invoked to locate the additional functions and map them (616) to logical CardBus functions at the CardBus PC Card accessory 104. When the code returns a check is made to see if all the logical functions have been assigned (618). If all functions are assigned the code returns to the caller (624).

If all assignments have not been made (618) the code then checks to see if all functions on the device have been checked (620). If all functions have been interrogated, the code returns to its caller (624), otherwise the process of interrogating each function continues once again (614).

Figure 7A:
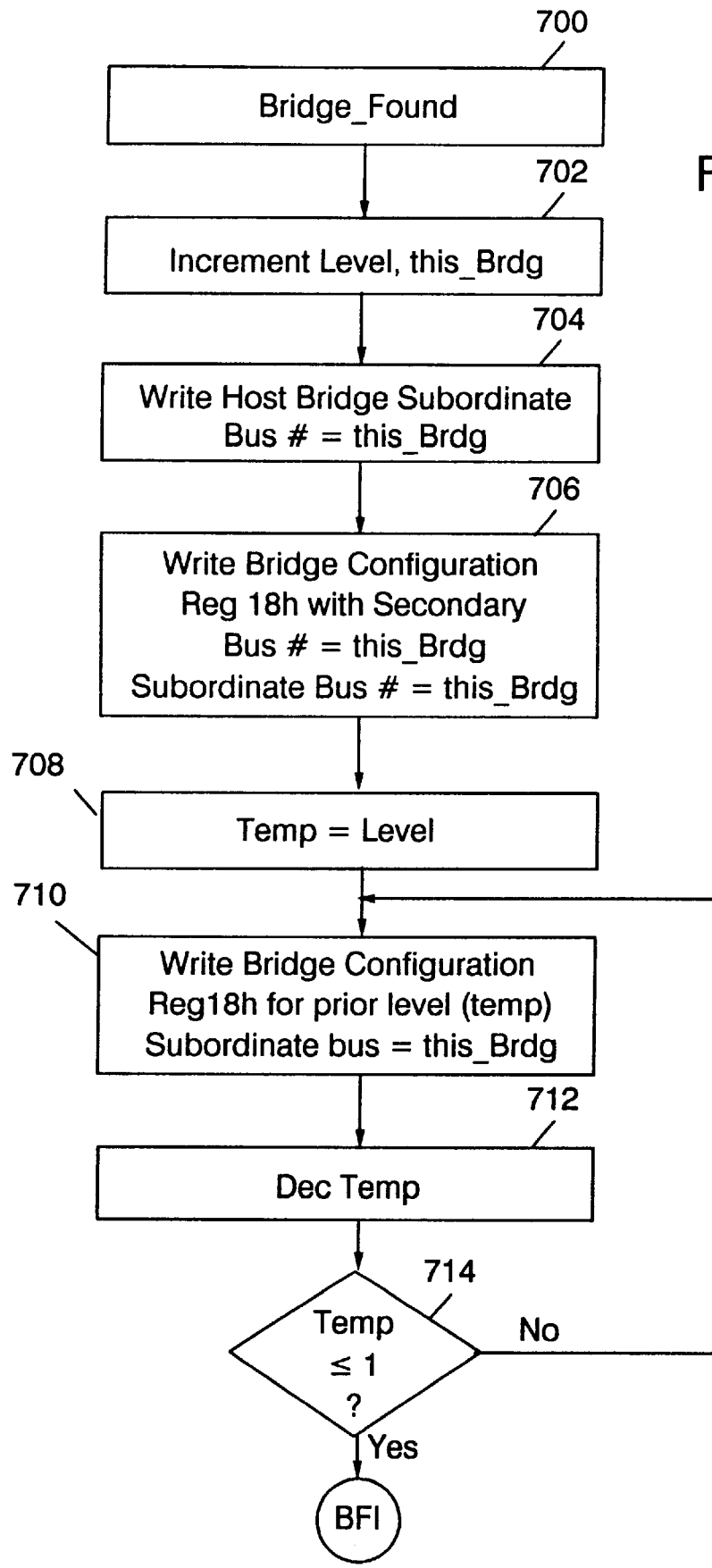

The Bridge_Found routine 700 (FIG. 7A) is used to find all bridges in the path to a PCI device. It is also used to configure the bridges intervening in the path to the device. First, the level and bridge counters are incremented (702). The host bridge, the first bridge on the docking station 303, subordinate bus number field is written with the number of the newly found bridge in its path to the device 704. Write the current bridge configuration Secondary bus number fields with the value in the Bridge Counter 706. Set up a temporary counter with the current bridge level in order to configure the intervening bridges between the host bridge and this bridge (708)

Figure 7B:
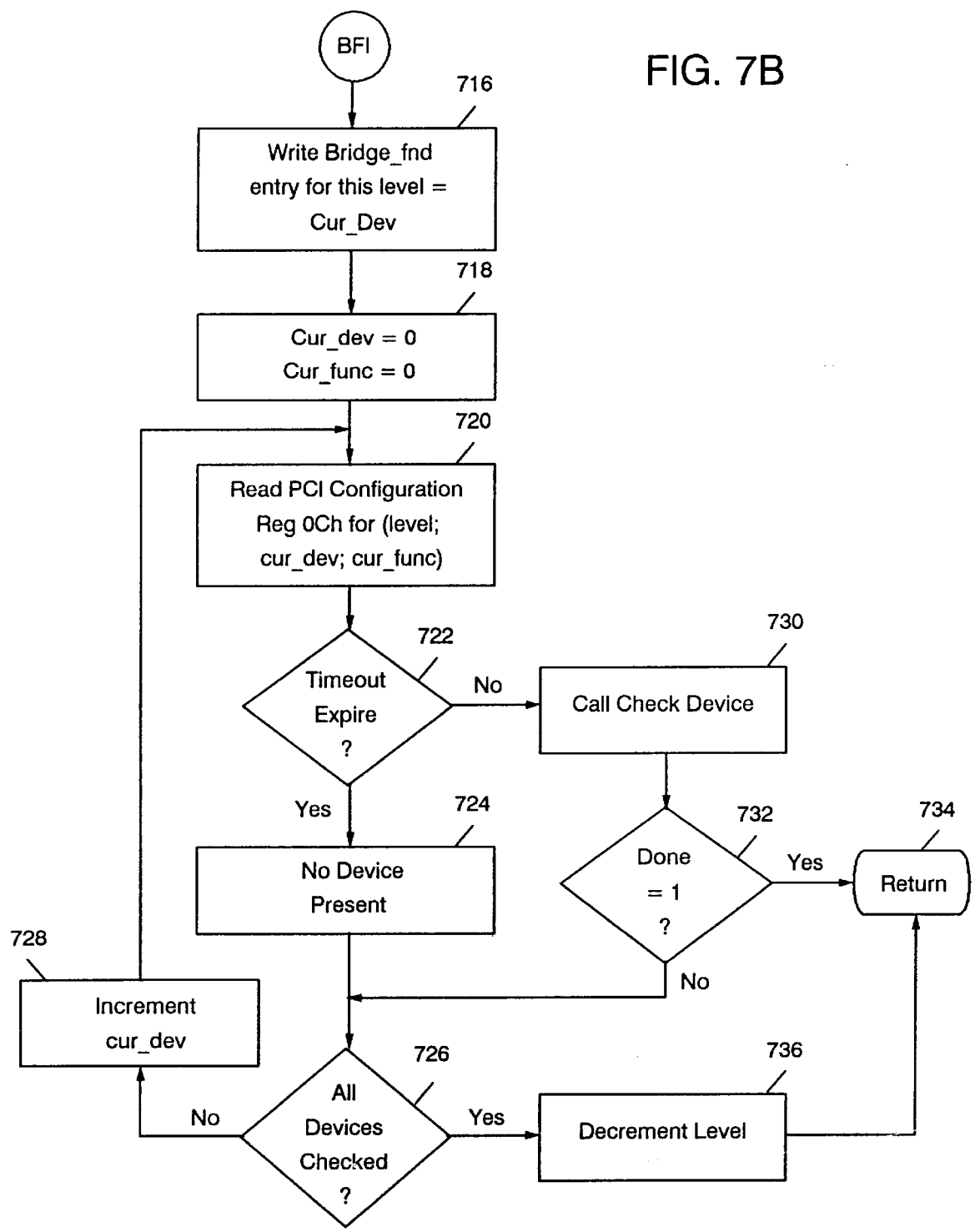

Next, write the subordinate bus number field in the current bridge 710. Point to the level above the current level 712. Check to see if all the intervening bridges have been configured (714). If not, restart the procedure at step 710. If all intervening bridges are configured (see FIG. 7B), write the entry in the bridge_fnd table using the values in the counter Cur_dev as an index for later use (716). Reset the current device, Cur_Dev and current function, Cur_Func counters to zero (718). Search the device space below the current bridge for the presence of additional devices (720).

Check to see if the 110 operation has timed out (722). If a device operation has not timed out, invoke the CheckDevice routine 730 to see if the subordinate device is a bridge or a device.

Upon return, check to see if all eight logical CardBus functions have been assigned (732). If all functions are allocated, return to the caller 734. If in step 732, not all CardBus logical functions have been allocated, check to see if all potential devices have been checked 726. If they have decrement the level counter (736) and return to the caller 734. If all potential devices have not been checked, increment the current device counter, cur_dev, 728 and repeat the procedure starting at step 720.

Returning to step 722, if the Read operation 720 expired, the addressed device does not exist 724, proceed to check that all devices have been interrogated as described above 726.

Figure 8A:
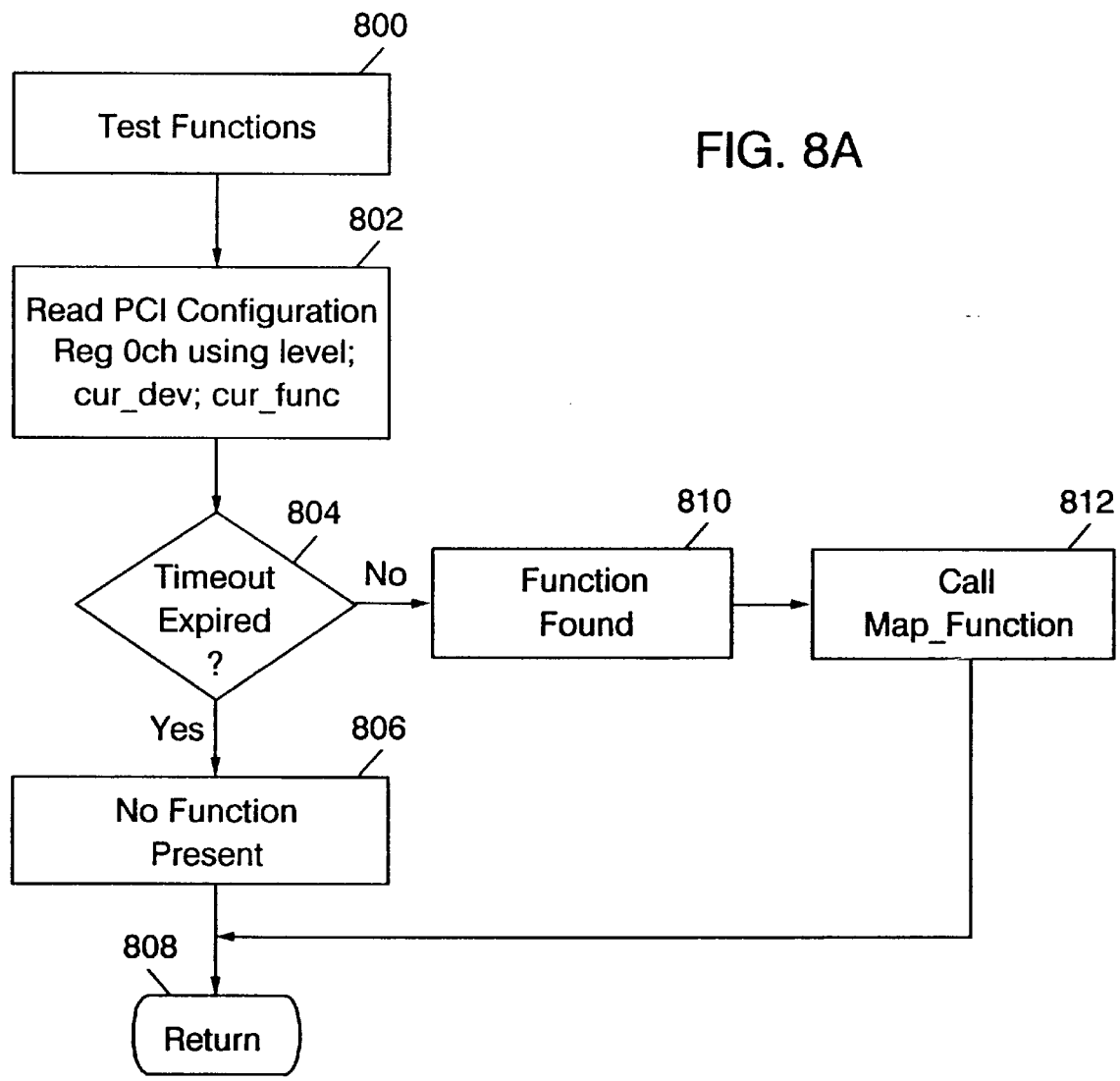

Referring to FIG. 8A, the Test Functions routine 800 is used to find all functions implemented on a multiple function PCI device. The function addressed by the current function counter, cur_func is interrogated to see if it exists 802. If the read operation times out 804 then no function is present 806. And the code returns to the caller 808. If the read operation 802 completes successfully, no time out, a function is present 810. The function is then mapped in the logical function space in the PC Card accessory 104 by the MAP_Function routine 812. After the mapping the code returns to the caller (808).

Figure 8B:
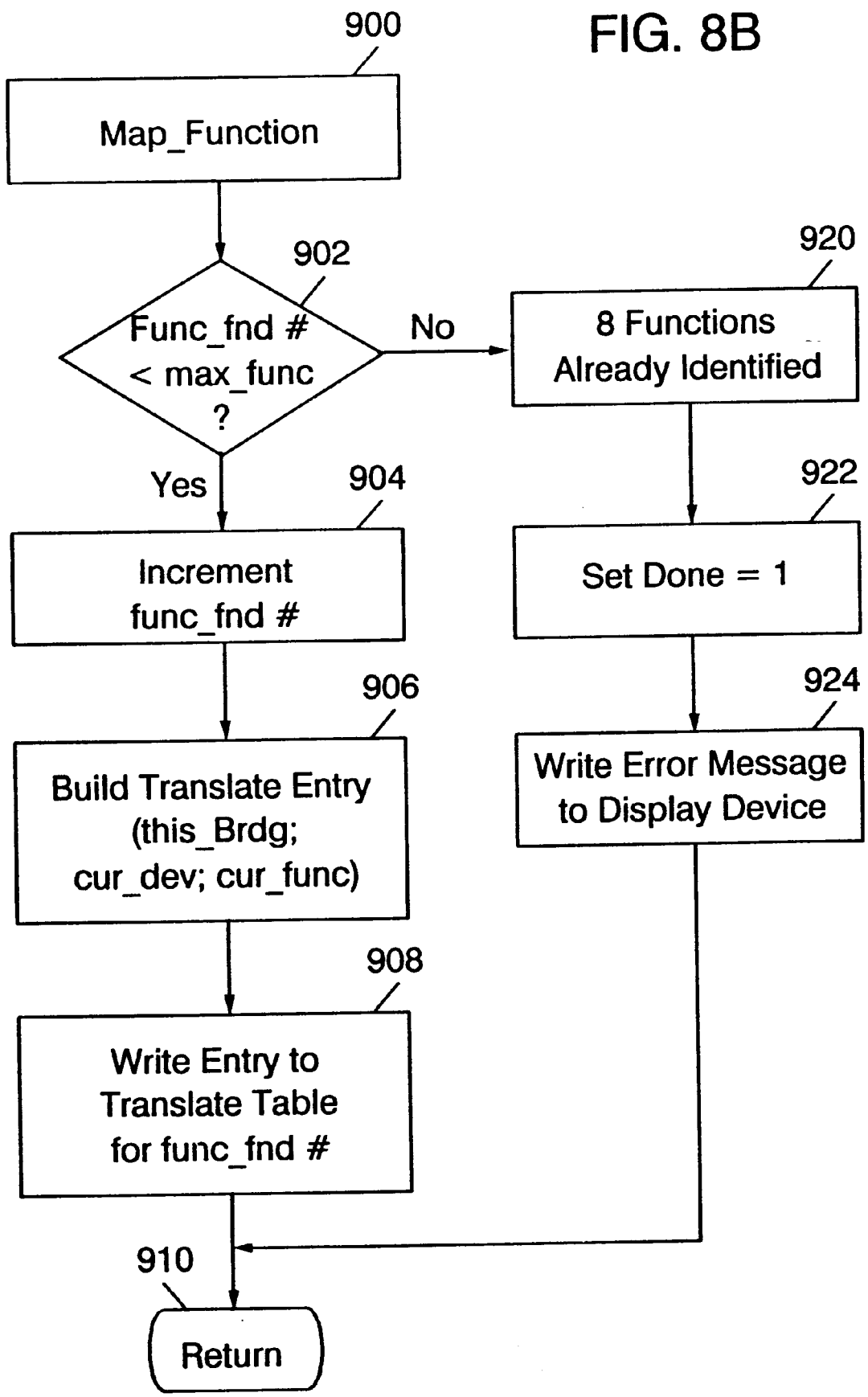

The Map_Function routine 900 (see FIG. 8B) is used to allocate the logical CardBus function address to the PCI physical device and build the hardware resident translation table stored at registers 302 (FIG. 3). Upon entry, the code checks to determine if the function found number counter, func_fnd#, is below the maximum number of CardBus functions allowed by the PC Card architecture 902. If below, not all of the functions were mapped, so the logic increments the function found number counter (904).

The translation table entry for this function is assembled using this bridge counter, this_brdg; current device counter, cur_div, and current function counter, cur_func 906. The entry is then written to the hardware resident table using the function found counter as an index 908. The code then returns the caller 910. If in step 902 all functions have been allocated 920, the finished configuration flag is set 922. An error message is written to a display device indicating not all PCI devices or functions in the docking station could be configured 924. The code then returns to the caller (910).

Once the PCI_Init routine 410 (see FIG. 5A) completes and the code is in the loop monitoring for an active reset, steps 412 and 414, the hardware resident translation table is fully constructed.

All that remains is for the host system 100 software to configure the CardBus logical functions. When this occurs, the CardBus accessory 104 will pass the transactions onto the PCI channel 304 in the docking station 200. The bridge logic 300 will use the hardware resident translation table to translate the configuration address, contents of the AD signals, to address the appropriate PCI devices in the physical channel 304.

In order to make the PCI devices installed in the docking station 200, the secondary side of the secondary master interface in the figure, appear as a single PCI device with multiple functions, the logic has to be modified to translate the Configuration Address, contents of the AD[31::2] signals, to address the appropriate PCI Devices in the physical channel.

The secondary master interface normally passes the contents of the AD[31::0] signals to the physical PCI Bus in the docking station unmodified. This invention requires additional logic in the secondary master interface to monitor the bus transactions for either a Configuration Read, C/BE[3::0] #=1010 h or a Configuration Write C/BE[3::0]#=1011 h. When either cycle is recognized the secondary master interface must perform a new translation function. Its function is to translate the configuration address presented during the PCI Bus operation on the AD[31::0] signals from the address that represents a logical PCI function on a single CardBus PC Card to the physical device on the PCI bus in the docking station.

The function consists of translating the type 0 Configuration Access Format AD[31::0] presented to the CardBus Card to the appropriate type for the addressed physical device on the docking station PCI Bus. Prior to redriving AD[31::0] signals onto the PCI Bus, the secondary master interface uses AD[10::8] as an index into a table stored at registers 302 (as discussed above with respect to FIGS. 3 and 8B). This will be referred to as the "translation table". The translation table provides the new bus numberAD [23::16]; device number AD[15::11]; and function number AD[10::8]. All other AD signals are driven on the bus in a fashion that is controlled by a bridge not providing this new function. The appropriate configuration format type containing the translated values are then passed to the secondary bus master. The secondary bus master uses the new bus number, device number, and function number to generate the appropriate PCI bus transaction in the docking station and IDSEL signal as described in the well known PCI to PCI Bridge Architecture Specification Rev. 1.0.

The invention in a preferred form has been described in detail with reference to the drawings. It should be appreciated that various alternatives and variations will be suggested to those skilled in the art which are within the contemplation of the invention and reference should be had to the claims to determine the scope of the protected invention. For example, if multiple PC card connectors are available at a base system multiple docking stations may be attached to allow more than eight PCI devices to be supported, the limit imposed by the number of PC card logical functions.

What is claimed is:

1. A docking station for a computer system that has an externally accessible PC Card interface for transferring signals conforming to the PC Card standard, said docking station comprising:

a docking station enclosure;

a PC Card connector that connects to and passes the signals from the PC Card interface of the computer system to the docking station enclosure;

a bus structure mounted within said docking station enclosure conforming to the PCI bus standard; and conversion logic connected to receive the signals from said PC Card connector which logic converts the signals thereon to signals for operating a PCI bus, whereby PCI operability is supported at the docking station.

2. A docking station according to claim 1 which includes plural storage devices connected to the PCI bus.

3. A docking station according to claim 2 wherein the storage devices are treated as respective PC Card functions at the PC Card interface.

4. A docking station according to claim 3 wherein the conversion logic analyzes the connected devices at the PCI bus to set up a table of correspondence between PCI devices and PC Card functions.

5. A docking station according to claim 4 wherein the table of correspondence is stored in registers forming part of the conversion logic.

6. A signal converter for a system having a PC Card interface and a PCI bus supporting PCI devices to allow signal transfers therebetween, said converter comprising:

connection points having sets of signal channels consistent with PC Card and PCI specifications respectively;

logic which creates a table of correspondance for PCI devices with PC Card functions, as a part of its initial setup on being activated and which logic converts signals arriving from the PC Card interface which correspond to predefined PC Card logical functions to signals identified with respective PCI devices which are applied at the PCI channels; and which converts signals arriving from the PCI devices to signals for the associated PC Card functions which are applied to the PC Card signal channels whereby bidirectional transfers between a PCI bus and a PC Card interface are supported.

7. A signal converter according to claim 6 wherein the logic creates a table of correspondence for up to eight PCI devices, one for each allowed PC Card function and upon detecting any further PCI devices on setup generates an error signal.

8. A signal converter according to claim 7 wherein the logic polls the PCI bus to locate all PCI devices at initial actuation and creates the table of correspondence in registers forming a part of the logic.

* * * * *